Figure 1:
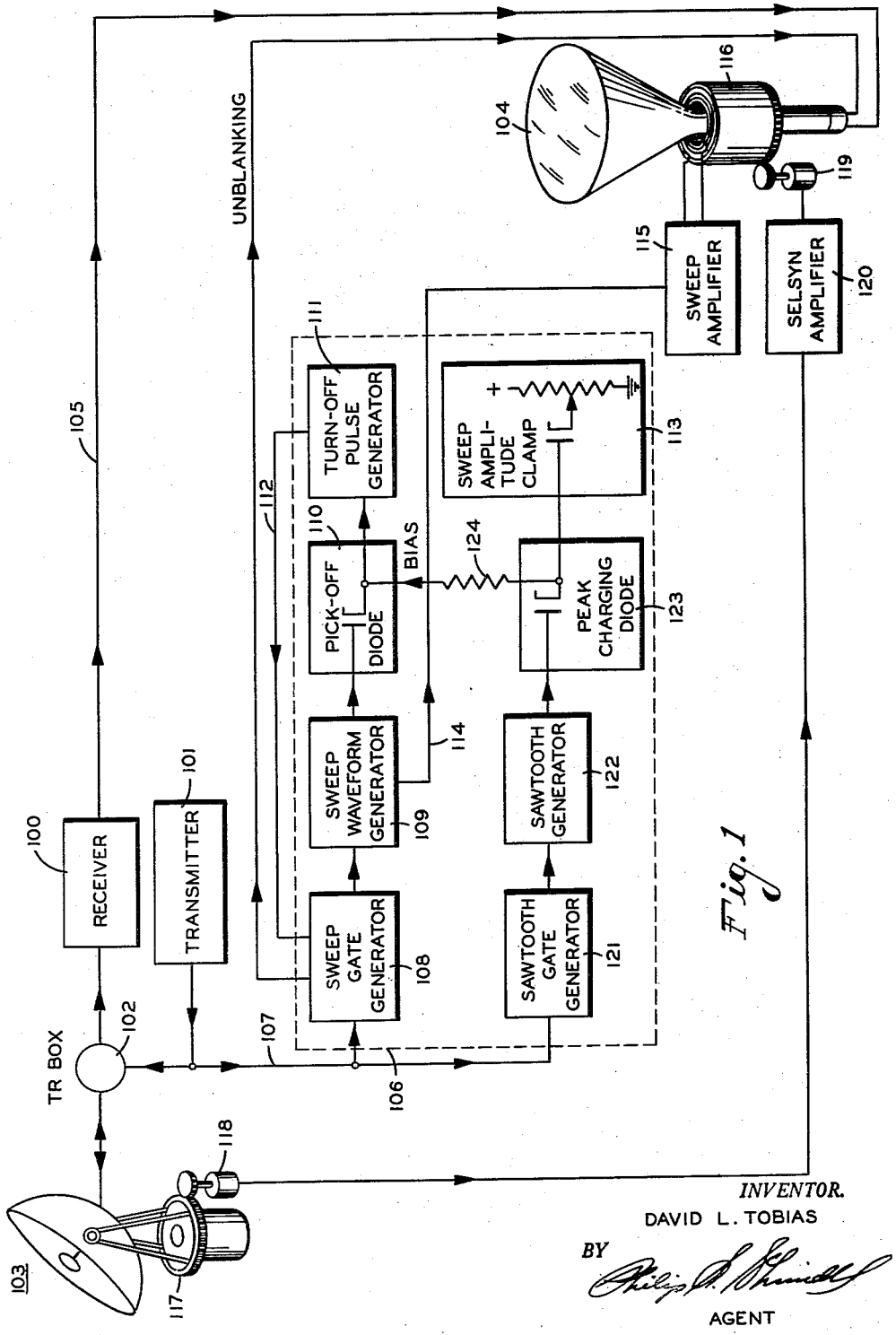

Sept. 2, 1958  D. L. TOBIAS  2,850,629
SWEEP GENERATOR

Filed Aug. 1, 1955  5 Sheets-Sheet 3

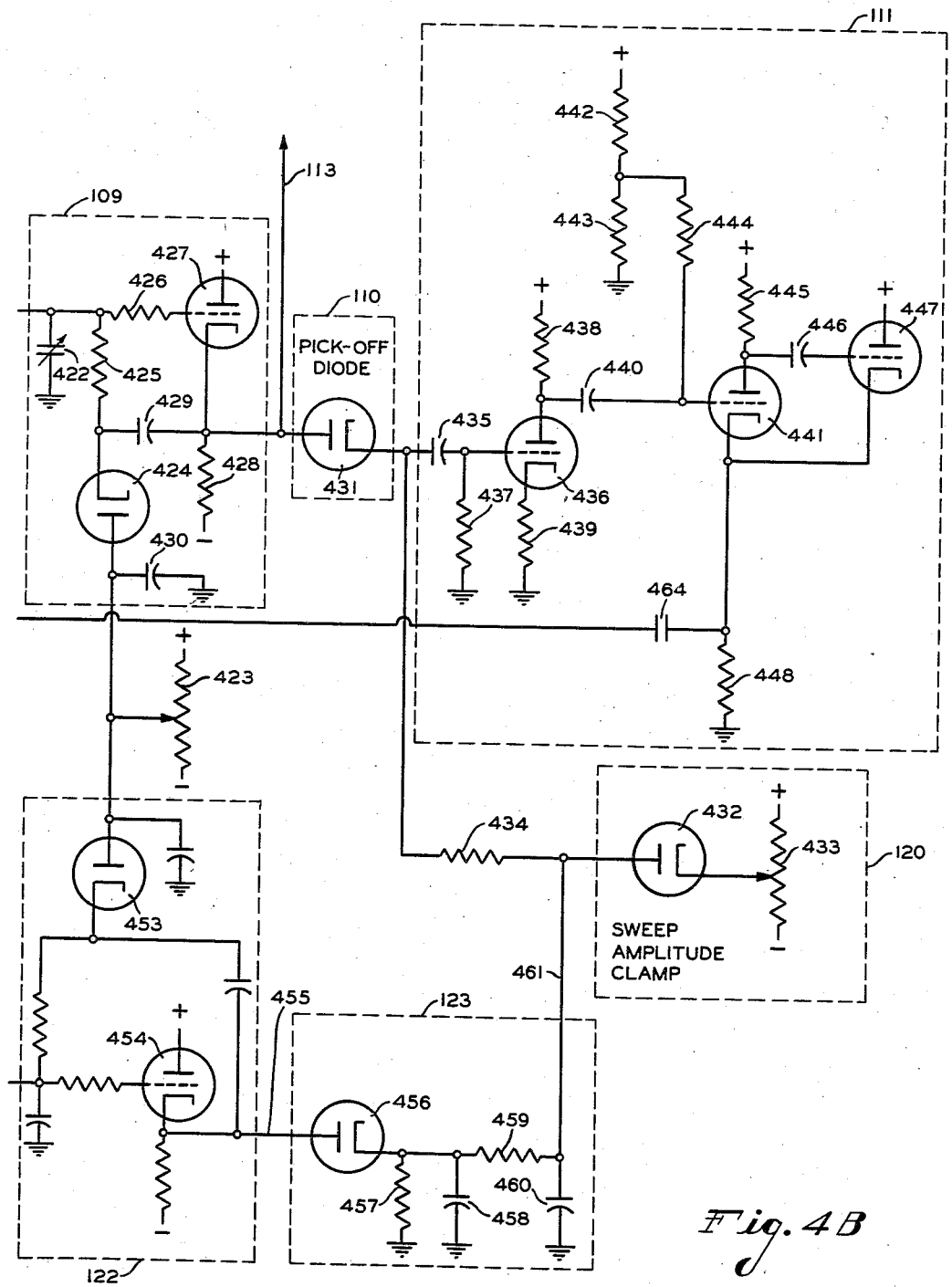

United States Patent Office 2,850,629
Patented Sept. 2, 1958

2,850,629

SWEEP GENERATOR

David L. Tobias, Rochester, N. Y., assignor to General Dynamics Corporation, a corporation of Delaware Application August 1, 1955, Serial No. 525,610

7 Claims. (Cl. 250—27)

My invention relates to sweep generators, and more particularly to means for preventing "sweep step-down."

Sweep generators are most often used to provide suitable voltage or current waveforms for moving an electron beam across the screen of a cathode ray tube. In many arts, particularly the radar art, each sweep is initiated by a trigger pulse. Frequently the operator is provided with means for selecting any of a number of sweep lengths, or durations, and any of a number of trigger pulse repetition frequencies.

Many combinations of sweep lengths and pulse repetition frequencies occasion no difficulty. However, a sweep generator cannot revert from its "on" condition to its "off," or quiescent, condition instantaneously. The inevitable presence of stray circuit parameters dictates that a small though finite interval of time elapse before the circuit is ready to start on its next excursion. This finite time is known in the art as "recovery" time.

When the sum of the sweep duration and the recovery time exceeds the trigger pulse repetition period, the sweep generator delivers a sweep in response to a first pulse, but cannot respond to a second. The third pulse brings a response from the sweep generator, but the fourth none, and so on. This response to alternate trigger pulses is known as "sweep step-down," and is undesirable not only because brightness may be decreased below an acceptable limit, but also because many radar equipments may have range marks and other types of information presented during alternate sweep intervals; if one sweep interval is lost, the information inserted during that period is lost.

Although sweep step-down is completely unacceptable for radar and other uses, other departures from standard performance may be acceptable to the user in order to avoid step-down. One such departure is a shortening of the sweep length by an amount of time sufficient to allow the circuit to recover before the next trigger pulse is received. A manual control might be provided so that the operator could decrease the sweep period by such an amount, but radars and other apparatus are frequently operated by only semi-skilled personnel. It is therefore desirable that the sweep period be shortened automatically whenever the operator selects a particular combination of sweep duration and pulse repetition frequency which would otherwise cause sweep step-down. In order to achieve maximum reliability of operation, it is also desirable that the maximum recovery time permissible be provided under every set of circumstances. Of course, there is a minimum recovery time for each sweep generator, and when this is reached, no further reduction is possible.

It is accordingly a broad object of my invention to provide a means for automatically preventing step-down in a sweep generator.

It is also an object of my invention to provide a sweep generator in which sweep step-down is prevented by simple and reliable means.

It is a specific object of my invention to provide a sweep generator in which the sweep amplitude may be automatically changed in a direct relationship to the trigger pulse period.

It is another object of my invention to provide a sweep generator having means for changing the sweep amplitude in a direct relationship to the trigger pulse period, but having means for preventing the operation of the amplitude changing means only when that period increases beyond a predetermined value.

It is a further object of my invention to provide a sweep generator in which the amplitude of the sweep waveform is changed in a direct relationship to the trigger pulse period, and in which the percentage change in amplitude increases as the trigger pulse period increases.

It is another object of my invention to provide a sweep generator having means for changing the amplitude of the sweep waveform in direct relationship to the trigger pulse period, the percentage change in amplitude increasing as the trigger pulse period increases, but in which means are provided for preventing the operation of the amplitude-changing means when the pulse repetition period increases beyond a predetermined value.

In general, I accomplish the foregoing and other objects of my invention by providing means for generating a control signal or bias, the amplitude of which varies with the trigger pulse period in a direct manner. In one embodiment of my invention, the less the bias, the sooner the sweep waveform is terminated. I prefer to obtain the bias by providing a sawtooth generator which is alternately initiated and terminated by succeeding trigger pulses, and to arrange the slope of the sawtooth waveform to be less than that of the sweep waveform for a given sweep range. It is important that the slope of the sawtooth waveform be unaffected by the trigger pulse period. Since the duration of the sawtooth waveform is fixed by the trigger pulse period, the peak voltage reached by the sawtooth waveform varies with the pulse period. I prefer to rectify this peak voltage and use it as the bias or control signal for controlling the termination time of the sweep waveform.

Further objects and advantages of my invention will become apparent as the following description proceeds and the features of novelty which characterize my invention will be pointed out with particularity in the claims annexed to and forming a part of this specification.

Figure 2:
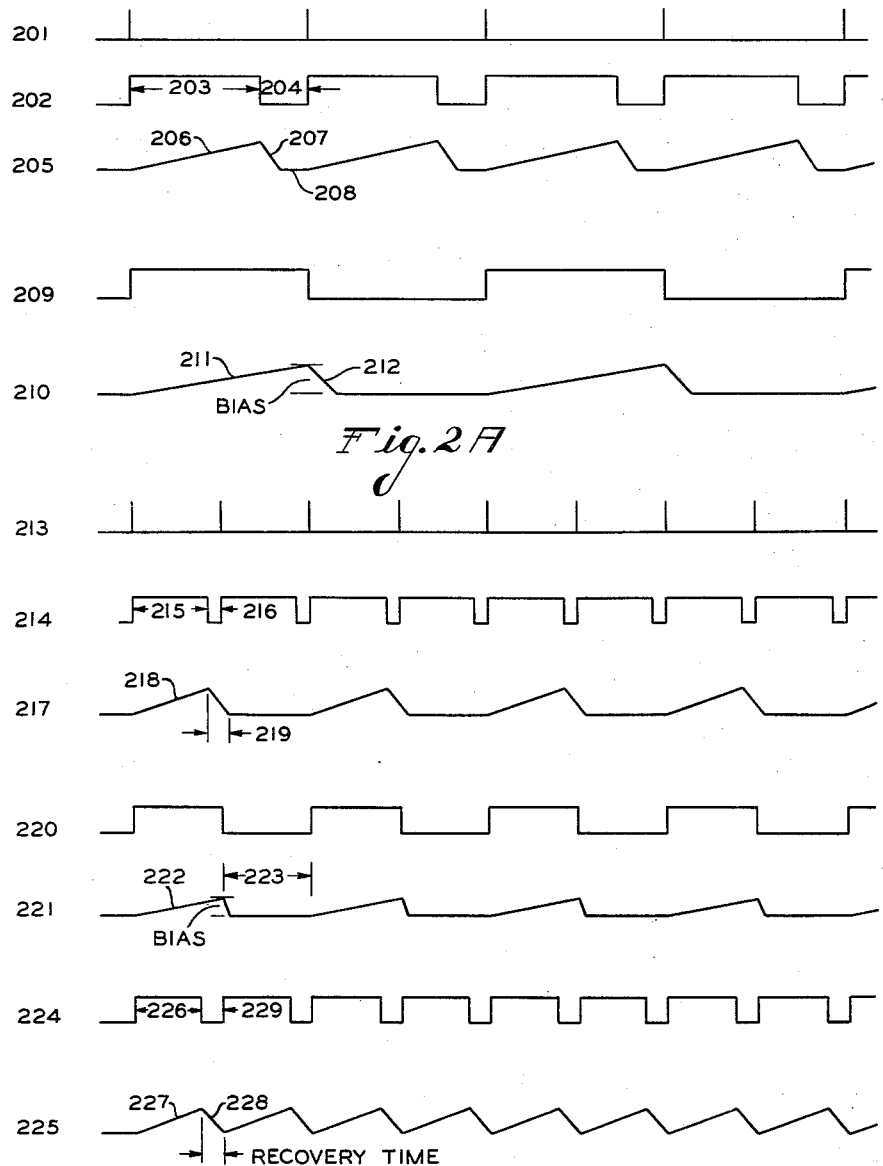
Figure 3:
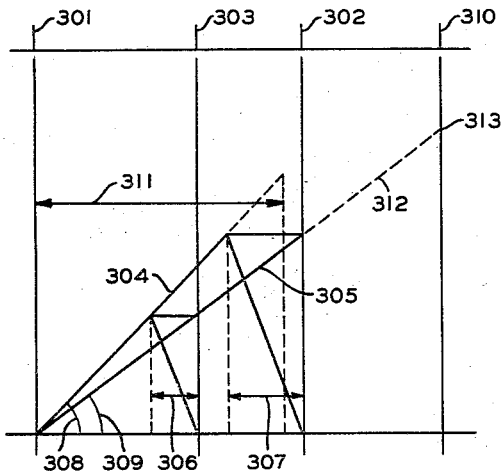
Figure 5:
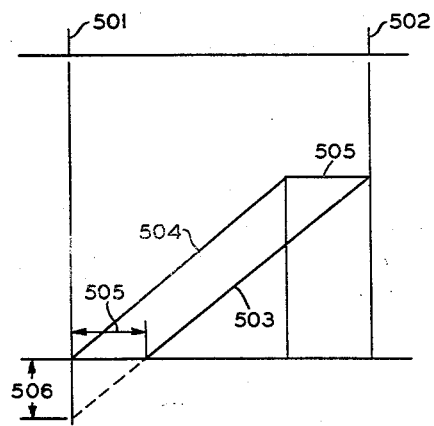
Figure 6:
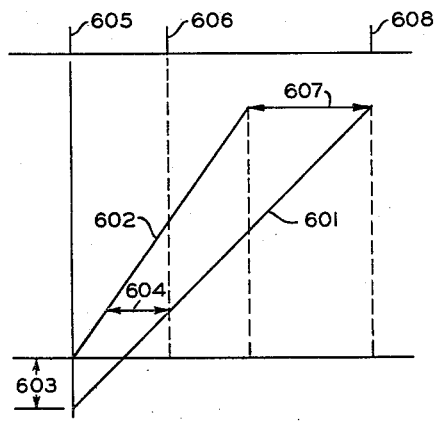
Figure 4A:
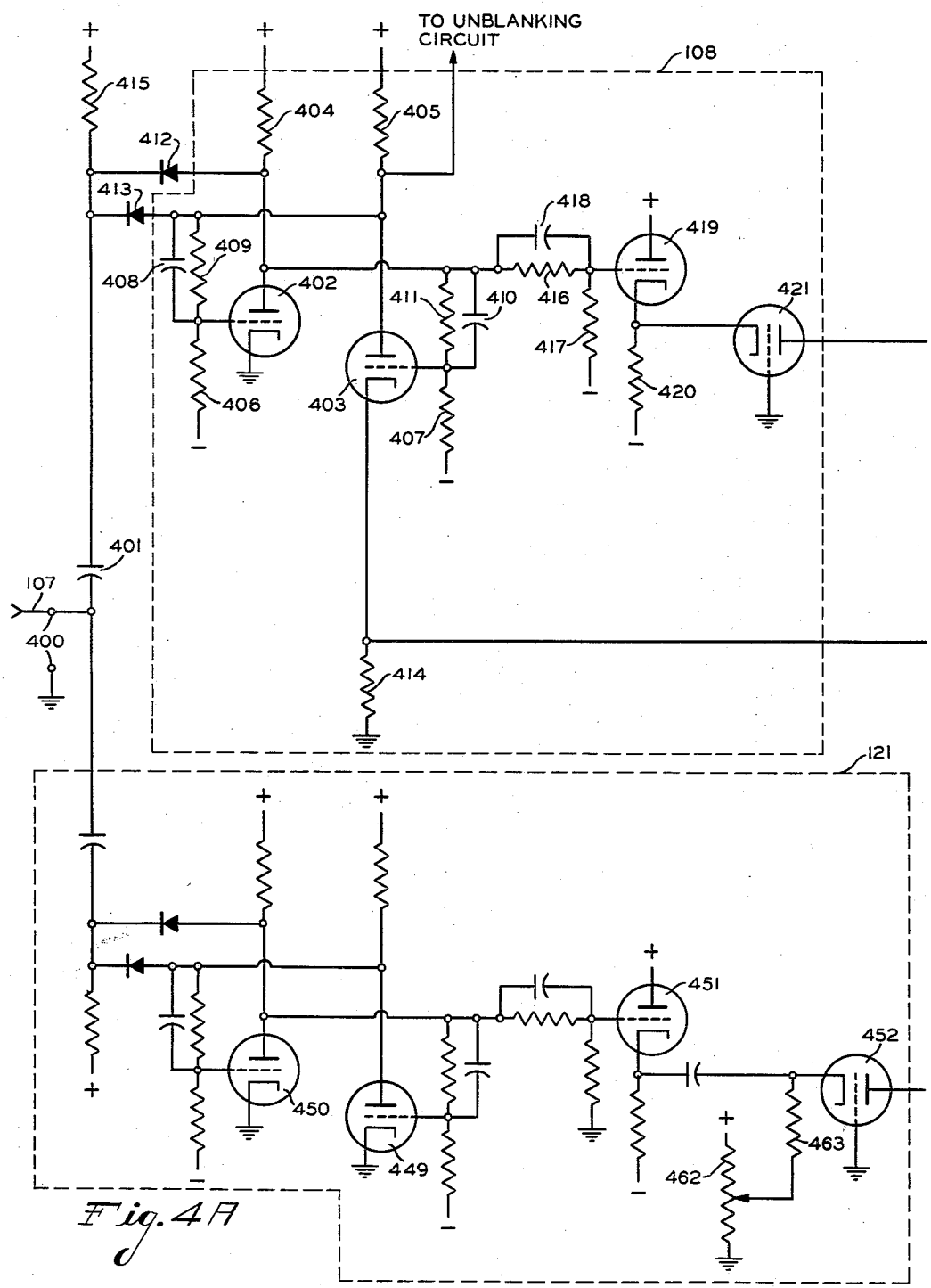

For a better understanding of my invention, reference may be had to the accompanying drawing in which Fig. 1 is a block diagram showing the application of my invention to a typical radar set;

Figs. 2A, 2B and 3 show waveforms useful in explaining my invention;

Figs. 4A and 4B comprise a schematic wiring diagram showing one embodiment of my invention; and Figs. 5 and 6 also show waveforms useful in explaining my invention.

In this specification, a block of reference numerals has been reserved for each figure, with the initial digit of each reference numeral being the number of the figure to which it is assigned. Thus, reference numerals 100–199 are assigned to Fig. 1, 200–299 to Fig. 2, etc. The system enables the reader, when he sees a given reference numeral in the text, to go directly to the particular figure in the drawings where the numeral first appears.

Throughout this specification, the ground symbol is used in a general sense, i. e., to indicate a unipotential plane which may be earth, a chassis, or a common connection in any specific realization of an embodiment of my invention. By way of generalization, a plus (+) sign is used in this specification to indicate a connection to the positive terminal of a source of substantially unidirectional potential, and the (−) terminal of the source is to be understood to be grounded. Similarly, a negative (−) sign indicates a connection to the negative terminal of a source of unidirectional potential, with the positive terminal thereof being grounded. In addition, I employ the word "terminal" in a figurative as well as literal sense to mean any type of connection into or out of a device or apparatus.

By trigger period, or pulse period, I mean the time between successive trigger pulses. I also refer to "sweep waveform" as that waveform actually employed to sweep the beam of a cathode-ray tube, and "sawtooth waveform" as another voltage involved in my invention, even through sweep waveforms are generally sawtoothed in shape; I prefer these functional designations for the sake of simplicity of language.

Explanation of block diagram

I have chosen to illustrate my invention as applied to a radar set. Referring to Fig. 1, there is shown a radar set comprising a receiver 100 and a transmitter 101 which are alternatively switched, as by TR box 102, to antenna assembly 103. A cathode ray tube assembly 104 displays the video information received via lead 105 from receiver 100. The display is indicated in this case to be a plan position indicator (P. P. I.). Sweeps for the cathode ray tube are generated in sweep generator 106.

In order to synchronize the sweeping of cathode ray tube 104 with transmitter 101, trigger pulses are conveyed via lead 107 to a sweep gate generator 108 in sweep generator 106. The gate waveform furnished by sweep generator 108 is used to control sweep waveform generator 109. A servo type of sweep generator is illustrated, in which the rise of a generally sawtoothed sweep waveform beyond a predetermined amplitude causes pick-off diode 110 to conduct and hence cause turn-off pulse generator 111 to furnish an "off-pulse" via lead 112 to the sweep gate generator 108 and thereby terminate the gate pulse. Upon termination of the gate pulse, sweep waveform generator 109 terminates the sweep waveform. The sweep waveform is prevented from varying beyond acceptable limits by sweep amplitude clamp 113. The sweep waveform is conveyed via lead 114 to an appropriate sweep amplifier 115, which furnishes sweep voltage to yoke 116.

Antenna 103 may be mounted on a rotatable, inclinable mount 117. The azimuthal position of antenna 103 may be conveyed by Selsyn transmitter 118 to Selsyn receiver 119 via Selsyn amplifier 120. Selsyn receiver 119 thereupon drives yoke 116 in synchronism with antenna 103. The items enumerated thus far are to be found in many typical radar systems.

In accordance with my invention, I may provide in addition a sawtooth gate generator 121 which feeds sawtooth generator 122. The latter is alternately initiated and terminated by succeeding trigger pulses, so the peak value reached by the resulting sawtooth waveform is directly proportional to the trigger pulse repetition period. A peak charging diode 123 connected to generator 122 develops a D.-C. control voltage, or bias, proportional to this peak value and algebraically adds this bias to that from sweep amplitude clamp 113.

Sweep amplitude clamp 113 is arranged so that the bias developed by peak charging diode 123 cannot increase the voltage applied to the cathode of pick-off diode 110 through resistor 124, but does not prevent diode 123 from decreasing that voltage. Thus, an increase in pulse period beyond the value at which bias from diode 123 equals that from diode 113 has no effect. A decrease in pulse period, however, decreases the value of bias developed by diode 123. As a result, less bias from sweep amplitude clamp 113 is applied to pick-off diode 110, and thereby causes pick-off diode 110 to conduct sooner and so initiate turn-off pulse generator 111 sooner than would otherwise be the case. Step-down is thereby prevented.

I prefer to control sawtooth generator 122 by means of sawtooth gate generator 121 which may be arranged to furnish a gate waveform which is alternately initiated and terminated by successive trigger pulses.

Explanation of waveform drawings

Fig. 2A illustrates by means of pertinent waveforms found in a radar set to which my invention is applicable the conditions under which no sweep step-down is encountered. Waveform 201 illustrates the appearance of a typical trigger pulse train found on lead 107. Sweep gate generator 108 may furnish waveform 202, in which portion 203 represents the sweep time and portion 204 the recovery time required for the sweep system to restore to its quiescent condition and remain quiescent for a while. This is further illustrated in sweep waveform 205 wherein slope 206 occupies the sweep period, portion 207 the flyback, or recovery period, and portion 208 the quiescent period.

Since sawtooth gate generator 121 governs the operation of sawtooth waveform generator 122, the output waveform 210 of the latter includes a sweep period 211 equal in duration to the on-time of waveform 209. A second portion 212 represents the recovery time of sawtooth waveform generator 122. It is apparent from waveform 210 that the sawtooth waveform generator furnishes an output only during alternate pulse periods.

Fig. 2B also illustrates the pertinent waveforms found in the embodiment of Fig. 1 when sweep step-down conditions are encountered without the advantage of my invention. Waveform 213 is a trigger pulse waveform at higher pulse repetition frequency than waveform 201. Waveform 214 shows the "gate-on" time 215 required to generate a sweep of the desired length. Under the conditions illustrated, portion 216 of waveform 214 is too short to allow sweep waveform generator 109 to recover. The foregoing situation is shown in waveform 217 in which slope 218 has the duration of gate-on portion 215, but recovery time 219 (the minimum recovery time possible with the parameters of the circuit of generator 109) is longer than the allowed recovery, or gate-off, portion 216 of waveform 214. Sweep waveform generator 109 cannot respond to the second trigger shown, because recovery time 219 has not elapsed. Therefore the second trigger shown does not actuate the sweep generator at all. The third trigger, however, comes at a time when sweep waveform generator 109 has been quiescent for some time, and therefore generator 109 operates.

Waveforms 220 and 221 correspond respectively to waveforms 209 and 210 under the higher pulse repetition frequency of waveform 213. As in the case of waveform 209, waveform 220 is alternately turned on and off by successive trigger pulses. Similarly, waveform 221 includes a rising portion 222 equal in duration to the gate-on portion of waveform 220, and a subsequent period 223 including recovery time and quiescent time throughout the gate-off period of waveform 220. The peak amplitude reached by waveform 221 is less than that reached by waveform 210 because the slope of portions 211 and 222 is identical, that is, the slope is constant regardless of trigger pulse period. The peak level reached by the output sawtooth generator 122 therefore has a direct relationship to the trigger pulse period. The rectified peak level is the peak charging diode bias or control signal mentioned previously.

The effect of this bias is illustrated by waveforms 224 and 225, which correspond respectively to waveforms 214 and 217. Waveform 224 shows that the output of sweep gate generator 108 has a duration 226 shorter than that of 215. Upward sweep portion 227 of sweep waveform 225 is of the same duration as portion 226, and therefore shorter than uncorrected waveform 218. The recovery portion 228 of waveform 225 consequently falls completely within the allowable period, that is, the gate-off time 229. As is clearly apparent from waveform 225, the sweep waveform generator 109 furnishes a sweep voltage for each input trigger pulse, even through of decreased amplitude, compared to the conditions that would be encountered if my invention were not employed.

In accordance with my invention, I prefer that the slope 211 of waveform 210 be slightly less than slope 206 of waveform 205. I presently regard a slope for waveform 211 as 10% less than that of slope 206 as satisfactory. A constant percentage difference in slope between these two waveforms provides a recovery time which is a constant percentage of the trigger pulse period.

Fig. 3 may be of assistance in understanding how a constant percentage recovery time may be allowed according to my invention. In this drawing, two pulse periods are shown, the first that between trigger pulse 301 and trigger pulse 302, and the second that between trigger pulse 302 and 303. Sweep waveform 304 and sawtooth waveform 305 have constant slopes regardless of the trigger pulse period. Periods 306 and 307 are the recovery times of the short and long pulse periods, respectively. Trigonometry establishes, since angles 308 and 309 have the same length of opposite side, that their adjacent sides must have a constant percentage difference. Thus, if the sweep and sawtooth waveforms have 10% difference in slope, the recovery time is necessarily 10% of the trigger pulse period over the range in which the anti-sweep step-down means according to my invention is operative. To illustrate a condition under which this anti-sweep step-down means is not operative, there is shown a pulse period extending between trigger pulses 301 and 310. In this case, the maximum sweep duration is indicated at 311. In this case, the sawtooth waveform continues to rise along dashed line 312 until peak value 313 is reached. Peak value 313 is arranged to be larger than the setting of the sweep amplitude clamp 113, and as already pointed out, cannot increase the latter. Consequently, when a pulse period as long as that between pulses 301 and 310 is selected, the anti-sweep step-down means is ineffective, since its benefits are not required.

*Explanation of schematic wiring diagram*

In Figs. 4A and 4B is shown the schematic wiring diagram of a sweep generator employing one embodiment of my invention. Input terminals 400 are adapted to receive negative trigger pulses on lead 107. These are conducted via capacitor 401 to sweep gate generator 108. Sweep gate generator 108 may be of any suitable type, a bi-stable multivibrator having triodes 402 and 403 being shown. These triodes are respectively provided with plate loads 404 and 405, grid ristors 406 and 407, and cross-coupling networks respectively including capacitor 408, resistor 409 and capacitor 410, resistor 411. I prefer to use crystal diodes, such as 412 and 413, to direct each trigger pulse to the conducting triode of the multivibrator, so that the trigger pulse always turns off the triode which is conducting.

Triode 402 conducts during the on-gate period because the turn-off pulse from turn-off pulse generator 111 is applied across cathode resistor 414 in the cathode circuit of triode 403 and hence turns off the latter tube. However, when the equipment is first turned on, either 402 or 403 may start to conduct. If triode 403 conducts initially, crystal diode 413 conducts the first trigger pulse to the plate of triode 403 to turn this triode off, and the next pulse received starts the first sweep. This pulse switching is possible because the cathodes of both crystal diodes 412 and 413 are returned to the same point; the plate of triode 402 is very nearly at the same potential when it is not conducting; and the bias across the diode 412, by virtue of resistor 415 being returned to the same value of positive voltage as plate resistor 404, is very low. The plate voltage of triode 403 may be about 100 volts below that of the plate of triode 402, and this voltage appears as a bucking voltage across diode 413. The grid of triode 403 is connected to the plate of diode 412 through resistor 411 and capacitor 410, and therefore when a trigger pulse causes diode 412 to conduct, the trigger appears as a negative pulse on the grid of triode 403, turning off the latter tube.

The output voltage of the bi-stable multivibrator is divided by resistors 416, 417 and shaped by capacitor 418 before being applied to the grid of triode 419. The latter tube is connected as a cathode follower with the output voltage appearing across resistor 420 for isolation purposes.

The output of cathode follower 419 is passed through triode 421, which acts as a clamp. Before the trigger arrives, triode 421 is conducting and its plate is approximately at ground potential because its cathode is held negative through resistor 420 and because the grid of triode 421 is grounded. The plate of triode 421 therefore cannot rise above ground potential until a trigger pulse is received. When the trigger pulse causes the multivibrator to change from one stable state to the other, cathode follower 419 conducts more and its cathode potential consequently rises. This cuts off triode 421, allowing its plate potential to rise.

The plate of clamp triode 421 is connected to charging capacitor 422 in sweep waveform generator 109. The latter is illustrated as being of the bootstrap type, in which capacitor 422 is charged from a source of voltage such as furnished by potentiometer 423 through charging diode 424 and resistor 425 in series. Those skilled in the art can readily appreciate, however, that other types of sweep waveform generators may be, and frequently are, used. The charging action occurs as soon as the trigger cuts off clamp triode 421 in sweep gate generator 108. The rise of voltage across sweep capacitor 422 is connected through isolating resistor 426 to the grid of bootstrap generator tube 427. This voltage rise appears across cathode resistor 428, and some of the A.-C. component of the rise is fed back through capacitor 429 and resistors 425 and 426 in series to the grid of triode 427. As is well known, the bootstrap feedback connection enhances the linearity of the sawtooth wave developed. Cacapitor 430 bypasses any A.-C. component of the sawtooth voltage which might find its way back to the source of charging voltage.

The plate of tube 431 in the pick-off diode circuit 110 is connected to the cathode of triode 427. The cathode of tube 431 is prevented from rising above a predetermined level by the sweep amplitude clamp 120, which comprises diode 432 whose cathode is connected to a source of D.-C. voltage such as that furnished by potentiometer 433. The plate of diode 432 is connected by way of resistor 434 to the cathode of tube 431. Pick-off diode 431 is thus biased by the voltage at the plate of the sweep amplitude clamp diode 432, which in turn depends on its cathode voltage and hence on the value of D.-C. voltage applied from potentiometer 433.

When the plate voltage of tube 431 rises above level of cathode voltage as predetermined by the setting of potentiometer 433, tube 431 conducts a voltage to turn-off pulse generator 111. The rise in voltage is fed through capacitor 435 to tube 436 of a pulse amplifier tube having grid resistor 437, plate resistor 438 and cathode resistor 439. The amplified output of the pulse amplifier is conveyed through capacitor 440 to the grid of tube 441 of the turn-off pulse generator circuit. The grid of tube 441 is positively biased by a network comprising resistors 442, 443 and 444. Tube 441 acts as an amplifier developing an increased voltage across its plate resistor 445 which is conveyed through capacitor 446 to the grid of tube 447. Cathode resistor 448 of tube 441 is also the cathode load of tube 447, thereby causing a regenerative action which rapidly boosts the voltage across resistor 448. This voltage amounts to a turn-off pulse which is conveyed through capacitor 464 to the cathode resistor 414 of sweep gate generator 108. This pulse turns off sweep gate generator 108 by causing triode 403 of the bi-stable multivibrator to turn off, and tube 402 consequently to conduct by reason of the connection through capacitor 408 and resistor 409 to the grid of tube 402. The non-conducting condition of tube 403 corresponds to the "gate-off" condition of the sweep gate generator.

The foregoing outlines the action of a sweep generator circuit suitable for use in radar receivers. Those skilled in the art can readily appreciate that many circuit configurations other than those shown are possible and will work equally well. Those skilled in the art are also aware that range change means are customarily provided in radar receivers, and that such range change means most often comprise means for switching various capacitors and resistors of different values into the circuit at the will of the operator. The circuit drawings herein have represented these range change means in a generalized form only for simplicity; thus, charging capacitor 422 has been indicated as being variable and charging voltage source 423 has been shown as a potentiometer. It is to be understood that this representation is by way of example only.

Sawtooth gate generator 121 may comprise a circuit virtually identical with that of sweep gate generator 108. The input is connected to terminals 400. The principal difference between sawtooth gate generator 121 and sweep gate generator 108 is the omission of the cathode resistor in the right-hand tube 449 of the multivibrator in generator 121 which includes triodes 449 and 450. The multivibrator therefore changes alternately from the "gate-on" to the "gate-off" condition in response to successive pulses. The cathode follower comprising tube 451 and the clamp tube 452 perform the same functions as their counterparts in first gate circuit 108. Again, those skilled in the art can understand that sawtooth and sweep gate generator arrangements other than those shown may be employed according to my invention without departing from the spirit and scope thereof, and that the particular circuit configuration set forth is given by way of example only.

The operation of the sawtooth waveform generator 122 is the same as that of sweep waveform generator 109, but its sweep period is fixed by the sawtooth gate generator's gate-on interval and therefore by the period between successive trigger pulses. The components, including charging diode 453 and bootstrap sweep generator 454, may be likewise substantially identical with those of the sweep waveform generator 109, except that the charging slope is preferably more gradual than that of the sweep waveform. In view of the virtual identity of operation, it is thought that the explanation of operation need not be repeated.

The sawtooth waveform appearing on lead 455 is fed to the plate of diode 456 in the peak charging diode circuit 123. Tube 456 constitutes unidirectional conductive means operative to pass current resulting from the waveform on lead 455 through resistor 457. The resulting voltage drop operates to charge storage means such as capacitor 458. The time constant of resistor 457 and 458 is such as to cause capacitor 458 to attain substantially the peak value of the sawtooth waveform. The slight sawtooth component superimposed on the D.-C. voltage appearing across capacitor 458 is filtered by resistor 459 and capacitor 460. The voltage thus appearing on lead 461 is the D.-C. control signal or bias which alters the sweep amplitude clamp voltage from the sweep amplitude clamp 120 through resistor 434 to change the voltage at which pick-off diode 431 conducts and causes a turn-off pulse to be generated in the turn-off pulse generator 111.

*Constant time and increasing percentage time arrangements*

Sweep generator circuits have a minimum allowable recovery time beyond which it is not advisable to go. Although my invention as described thus far makes it possible to allow the maximum recovery time for each sweep encountered, pulse periods below a certain minimum should permit the minimum recovery time to be used. In other words, a constant recovery time is desired below a predetermined pulse period.

It is possible in accordance with my invention to provide a constant recovery time. To accomplish this, it is only necessary to arrange the sawtooth generator to furnish a waveform of the same slope as the sweep generator, but delayed by the constant recovery time desired. The situation is illustrated in Fig. 5, wherein pulses 501 and 502 determine the pulse period, and sawtooth waveform 503 has the same slope as sweep waveform 504. The former waveform, however, is delayed by a time 505 after the latter. From geometry, it is apparent that delay time 505 is constant through any value of pulse period up to that determined by the voltage setting of sweep amplitude clamp 120.

In accordance with my invention, I prefer to accomplish the same result as delayed waveform 503 by starting waveform 503 at the same time but at a lower value of voltage 506. Reference to Fig. 4 shows how this may be done. A source of positive voltage is furnished by potentiometer 462 through resistor 463 to the cathode of sawtooth gate clamp tube 452. Since this tube operates in the same fashion as was explained in connection with clamp tube 421, it is apparent that the sawtooth sweep may be started at a lower voltage than the sweep voltage in sweep waveform generator 109.

The advantages of a constant percentage recovery time and a constant recovery time may be combined according to my invention to yield a recovery time which increases in percentage of the pulse period as the pulse period increases. To accomplish this, it is only necessary, as shown in Fig. 6, to proportion the parameters of the sawtooth waveform generator with a slope 601 more gradual than that of sweep waveform 602, and also to start the former waveform at a lower voltage 603 than the latter. As is apparent from the geometry of Fig. 6, recovery time 604 is a greater percentage of the pulse period between trigger pulses 605 and 606, than recovery time 607 is of the period between pulses 605 and 608.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a sweep generator, the combination of input terminals for receiving a succession of trigger pulses; means for generating a sweep waveform in response to each said trigger pulse received at said terminals; means for changing the amplitude of said sweep waveform generated in said last-named means in a direct relationship to the trigger pulse period, whereby the maximum recovery time for said sweep generating means before another said trigger pulse arrives at said terminals may be obtained, and means for preventing the operation of said amplitude-changing means only when said trigger pulse period increases to a predetermined value beyond which recovery time is not a factor affecting reliable operation.

2. In a sweep generator, the combination of input terminals for receiving a succession of trigger pulses; means for generating a sweep waveform in response to each said trigger pulse received at said terminals; means for changing the peak amplitude of said sweep waveform from said generating means in a direct relationship to the trigger pulse period; means for increasing the change of amplitude as said pulse period increases, and means for preventing the operation of said amplitude-changing means only when said trigger pulse period increases to a predetermined value beyond which recovery time is not a factor affecting reliable operation.

3. In a sweep generator, the combination of input terminals for receiving a succession of trigger pulses; means for generating a sweep waveform in response to each said trigger pulse received at said terminals; means for generating a signal having a characteristic proportional to the trigger pulse period; means for changing the amplitude of said sweep waveform in a direct relationship to said signal, whereby the maximum recovery time for said sweep generating means before another said trigger pulse arrives at said terminals may be obtained, and means for preventing the operation of said amplitude-changing means only when said trigger pulse period increases to a predetermined value beyond which recovery time is not a factor affecting reliable operation.

4. In a sweep generator, the combination of input terminals for receiving a succession of trigger pulses; means for generating a sweep waveform in response to each said trigger pulse received at said terminals; means for generating a signal having a characteristic proportional to the trigger pulse period; means for changing the peak amplitude of said sweep waveform in a direct relationship to said signal, means for increasing the percentage of said change of amplitude effected by said signal as said pulse period increases, and means for preventing the operation of said amplitude-changing means only when said pulse period increases to a predetermined value beyond which recovery time is not a factor affecting reliable operation.

5. In a sweep generator, the combination of input terminals for receiving a succession of trigger pulses; means for generating a sweep gate waveform in response to each said trigger pulse received at said terminals; means gated on by said sweep gate waveform for generating a sweep waveform; means including unidirectional conducting means operative when each said sweep waveform reaches a predetermined amplitude for generating a turn-off pulse; means for applying said turn-off pulse to said sweep waveform generating means and for causing the termination of said sweep gate waveform; means biasing said unidirectional conducting means in a direction tending to cause generation of said turn-off pulse at a higher level of said sweep waveform; means for generating a sawtooth gate waveform, said sawtooth gate waveform being alternately initiated and terminated by successive ones of said trigger pulses; means gated on by said sawtooth gate waveform for generating a generally sawtooth waveform; means utilizing said sawtooth waveform for deriving a substantially D.-C. control voltage substantially equal to the peak value reached by said sawtooth waveform; and means for biasing said unidirectional conducting means with said control voltage in a direction tending to cause generation of said turn-off pulse at a lower level of said sweep waveform than without said control voltage, whereby the duration of said sweep waveform has a direct relationship to the trigger pulse period.

6. The combination of claim 5 in which there is provided means for increasing the percentage of time between termination of said sweep and said sawtooth waveforms relative to said pulse period as said pulse period increases.

7. In a sweep generator, the combination of input terminals for receiving a succession of trigger pulses, a sweep gate generator triggered on by trigger pulses received at said terminals; a sweep waveform generator connected to said sweep gate generator and initiated thereby; a pick-off diode connected to said sweep waveform generator and operative to pass as much of said sweep generator output as exceeds a predetermined level; a turn-off pulse generator connected to said pick-off diode and operative to generate a turn-off pulse as soon as said pick-off diode passes any portion of said output of said sweep waveform generator; a connection from said turn-off pulse generator to said sweep gate generator, said connection being made such that said turn-off pulse generator is effective to terminate the gate waveform furnished by said sweep gate generator; a sawtooth gate generator connected to said source of trigger pulses and arranged alternately to initiate and terminate a sawtooth gate waveform on successive ones of said trigger pulses; a sawtooth waveform generator connected to said sawtooth gate generator and arranged to be started and stopped thereby, whereby said sawtooth waveform generator alternately furnishes a sawtooth waveform and no output in successive pulse periods; and a peak charging diode circuit arranged to develop a D.-C. control signal proportional to the peak voltage of said sawtooth waveform, said control signal being applied to said pick-off diode as a bias so polarized that said turn-off pulse generator is operated sooner in the cycle of said sweep waveform generator than would be the case without said control signal as the trigger pulse period increases.

References Cited in the file of this patent

UNITED STATES PATENTS

| | | |
|---|---|---|
| 2,188,611 | Norton | Jan. 30, 1940 |
| 2,265,290 | Knick | Dec. 9, 1941 |
| 2,266,516 | Russell | Dec. 16, 1941 |
| 2,389,025 | Campbell | Nov. 13, 1945 |
| 2,414,486 | Rieke | Jan. 21, 1947 |
| 2,431,766 | Miller et al. | Dec. 2, 1947 |
| 2,492,018 | Sunstein | Dec. 20, 1949 |
| 2,569,164 | Greenwood et al. | Sept. 25, 1951 |
| 2,596,167 | Philpott | May 13, 1952 |
| 2,720,646 | Berger et al. | Oct. 11, 1955 |